US011875958B2

(12) United States Patent
Takeda

(10) Patent No.: US 11,875,958 B2
(45) Date of Patent: Jan. 16, 2024

(54) METHOD OF CONNECTING ELECTRIC ELEMENT

(71) Applicant: Uchiya Thermostat Co., Ltd., Saitama (JP)

(72) Inventor: Hideaki Takeda, Misato (JP)

(73) Assignee: Uchiya Thermostat Co., Ltd., Saitama (JP)

( * ) Notice: Subject to any disclaimer, the term of this patent is extended or adjusted under 35 U.S.C. 154(b) by 255 days.

(21) Appl. No.: 17/309,022

(22) PCT Filed: Jul. 23, 2019

(86) PCT No.: PCT/JP2019/028866

§ 371 (c)(1),
(2) Date: Apr. 14, 2021

(87) PCT Pub. No.: WO2020/079908

PCT Pub. Date: Apr. 23, 2020

(65) Prior Publication Data

US 2021/0391131 A1 Dec. 16, 2021

(30) Foreign Application Priority Data

Oct. 18, 2018 (JP) ................................ 2018-196632

(51) Int. Cl.
*H01H 37/04* (2006.01)
*H01H 1/58* (2006.01)
(Continued)

(52) U.S. Cl.
CPC ...... *H01H 37/5427* (2013.01); *H01H 37/043* (2013.01); *H05B 45/56* (2020.01); *H01H 2037/5463* (2013.01)

(58) Field of Classification Search
CPC ...... H05B 1/0213; H01H 37/04; H01H 37/52; H01H 37/54; H01H 37/5427;
(Continued)

(56) References Cited

U.S. PATENT DOCUMENTS 4,563,667 A * 1/1986 Hofsass ............. H01H 37/5427 337/349
4,725,698 A * 2/1988 Takai ..................... H01R 31/02 200/16 R
(Continued)

FOREIGN PATENT DOCUMENTS

JP 55077348 A 5/1980
JP 4055730 U 5/1992
(Continued)

OTHER PUBLICATIONS

"International Application Serial No. PCT/JP2019/028866, International Search Report dated Oct. 15, 2019", w/ English Translation, (dated Oct. 15, 2019), 4 pgs.
(Continued)

*Primary Examiner* — Thai Pham
(74) *Attorney, Agent, or Firm* — Schwegman Lundberg & Woessner, P.A.

(57) ABSTRACT

A method of connecting an electric element (20) to a switch part (10) provided with a fixed contact (11*a*), i.e., an example of a first contact, a first terminal (12) connected to the fixed contact (11*a*) and exposed out of the switch part (10), a movable contact (11*b*), i.e., an example of a second contact, capable of moving to a position at which the movable contact (11*b*) is in contact with the fixed contact (11*a*) and a position at which the movable contact (11*b*) is spaced apart from the fixed contact (11*a*), and a second terminal (13) connected to the movable contact (11*b*) and exposed out of the switch part (10) includes: connecting the electric element (20) in parallel to the fixed contact (11*a*) and the movable contact (11*b*) between the first terminal (12) and the second terminal (13).

2 Claims, 11 Drawing Sheets

(51) Int. Cl.
*H01H 37/54* (2006.01)
*H05B 45/56* (2020.01)

(58) Field of Classification Search
CPC ... H01H 2037/5463; H01H 2037/5481; H01H 2205/002; H01H 1/504; H01H 1/58; H01H 9/00; H01H 9/02
See application file for complete search history.

(56) References Cited

U.S. PATENT DOCUMENTS

| | | | | |
|---|---|---|---|---|
| 6,414,285 B1 * | 7/2002 | Takeda | H01H 37/54 | 219/512 |
| 2009/0186507 A1 * | 7/2009 | Watanabe | H01R 4/185 | 439/282 |
| 2012/0212210 A1 * | 8/2012 | Takeda | H01H 1/504 | 323/369 |
| 2014/0111299 A1 * | 4/2014 | Takeda | H01H 61/01 | 337/85 |
| 2016/0099119 A1 * | 4/2016 | Miyoshi | H01H 9/0271 | 361/781 |
| 2019/0296500 A1 * | 9/2019 | Morello | H01R 24/60 | |

FOREIGN PATENT DOCUMENTS

| | | |
|---|---|---|
| JP | 2015103336 A | 6/2015 |
| JP | 6163889 A | 7/2017 |

OTHER PUBLICATIONS

"International Application Serial No. PCT/JP2019/028866, Written Opinion dated Oct. 15, 2019", w/ English Translation, (dated Oct. 15, 2019), 7 pgs.

* cited by examiner

METHOD OF CONNECTING ELECTRIC ELEMENT

PRIORITY APPLICATIONS

This application is a U.S. National Stage Filing under 35 U.S.C. § 371 from International Application No. PCT/JP2019/028866, filed on Jul. 23, 2019, and published as WO2020/079908 on Apr. 23, 2020, which claims the benefit of priority to Japanese Application No. 2018-196632, filed on Oct. 18, 2018; the benefit of priority of each of which is hereby claimed herein, and which applications and publication are hereby incorporated herein by reference in their entireties.

TECHNICAL FIELD

The present invention relates to a method of connecting an electric element to a switch part.

BACKGROUND ART

It has been difficult up to the present to connect an electric element in parallel to a contact of a switch such as a temperature switch for interrupting a current upon sensing a temperature change, because doing so could hinder the ensuring or evaluation of the interruption performance (see, for example, patent documents 1 and 2).

PRIOR ART DOCUMENTS

Patent Documents

Patent Document 1: Japanese Patent No. 6163889
Patent Document 2: Japanese Laid-open Patent Publication No. 2015-103336

SUMMARY OF THE INVENTION

Problems to be Solved by the Invention

In the meantime, regarding a switch having a plurality of electric ratings, connecting electric elements in parallel to contacts of the switch requires the performance assurance with the maximum conditions, and a withstand voltage between the contacts of the switch will also be applied to the electric elements connected in parallel to the contacts. Thus, the electric elements provided inside will also be evaluated in terms of insulation distance (spacing), and hence there will be difficulty in providing electric elements inside the switch. Meanwhile, in the case of a configuration in which a contact is in an OFF state at an ordinary temperature, consideration needs to be given even to the fact that a maximum rated voltage could always be applied to electric elements, and treatments needs to be prepared for the withstand pressure of components, special inspections, size enlargement, and the like, thereby leading to a cost problem.

An object of the present invention is to provide an electric-element connection method that allows an electric element to be easily connected to a switch part.

Means for Solving Problems

In one aspect, an electric-element connection method is a method of connecting an electric element to a switch part provided with a first contact, a first terminal connected to the first terminal and exposed out of the switch part, a second contact capable of moving to a position at which the second contact is in contact with the first contact and a position at which the second contact is spaced apart from the first contact, and a second terminal connected to the second contact and exposed out of the switch part, the method comprising connecting the electric element in parallel to the first and second contacts between the first and second terminals.

Effect of the Invention

The aforementioned aspect allows an electric element to be easily connected to a switch part.

DESCRIPTION OF EMBODIMENTS

Figure 1:
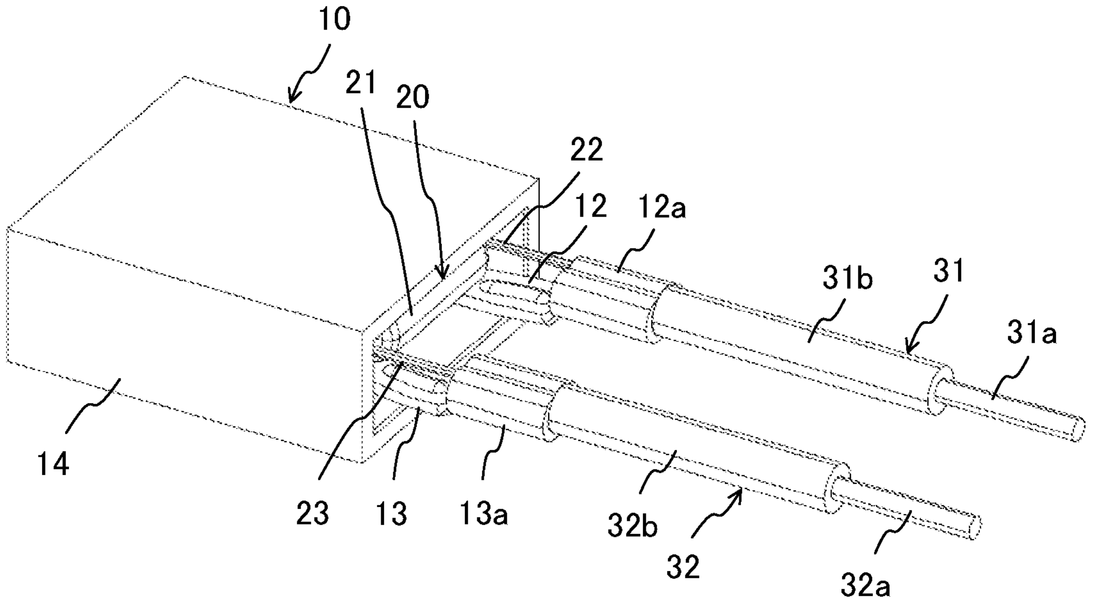
FIG. 1 is a perspective view illustrating a switch part with an electric element connected thereto in a first embodiment.

The following describes methods of connecting an electric element in accordance with first and second embodiments of the present invention by referring to the drawings.

First Embodiment

FIG. 1 is a perspective view illustrating a switch part 10 with an electric element 20 connected thereto in a first embodiment.

Figure 2:
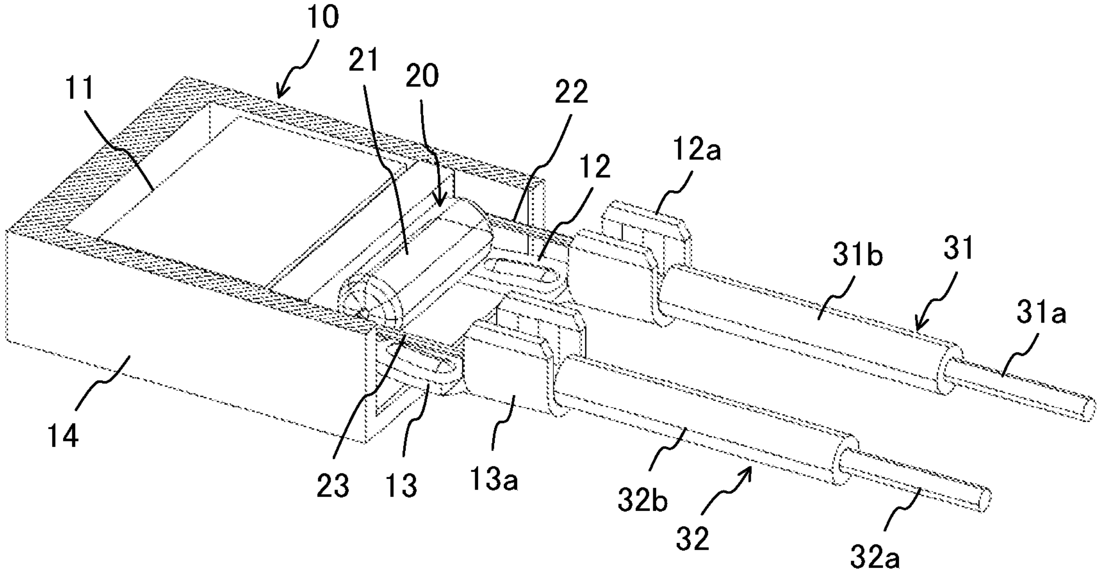
FIG. 2 is a cross-sectional view for illustrating a method of connecting an electric element in accordance with a first embodiment (example 1)
Figure 3:
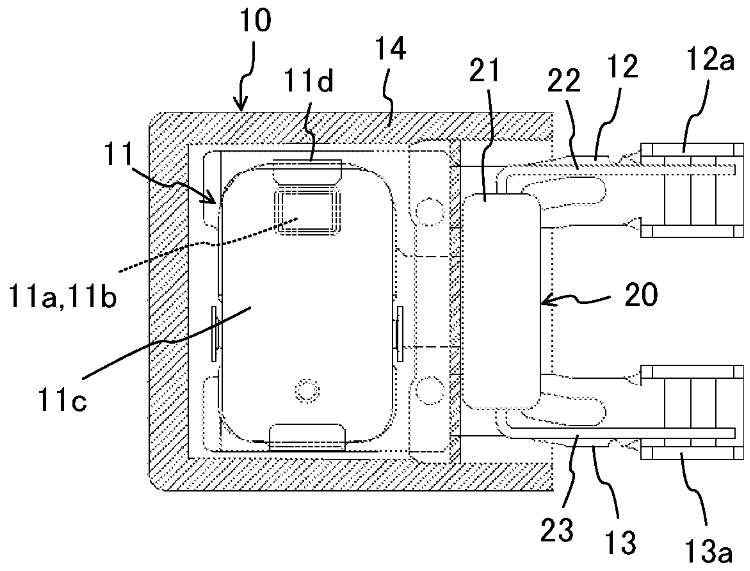
FIG. 3 is a cross-sectional view for illustrating a method of connecting an electric element in accordance with a first embodiment (example 2)

FIGS. 2 and 3 are cross-sectional views for illustrating a method of connecting the electric element 20 in accordance with the first embodiment.

A switch part 10 depicted in FIGS. 1-3 includes a switch body 11, a first terminal 12, a second terminal 13, and an insulation case 14. For example, the switch part 10 may be a temperature switch. The switch part 10 is not limited to a temperature switch but may be, for example, an electric relay driven by a control voltage from outside, a controller operated in accordance with a change in various physical amounts, or a manual manipulation switch.

As depicted in FIG. 3, the switch body 11 includes a fixed contact 11*a*, i.e., an example of a first contact, a movable contact 11*b*, i.e., an example of a second contact, a bimetal element 11*c*, and an elastic plate 11*d*.

The fixed contact 11*a* is closer to the bottom surface than the movable contact 11*b* is. The fixed contact 11*a* may be disposed on a resin base. The movable contact 11*b*, at an ordinary temperature, is positioned to be spaced apart from the fixed contact 11*a*, such that the fixed contact 11*a* and the movable contact 11*b* are in a contact OFF state at an ordinary temperature.

For example, the bimetal element 11*c* may be formed by laminating two alloys shaped like flat plates having different thermal expansion coefficients on each other. The bimetal element 11*c* is held by the elastic plate 11*d*. The movable contact 11*b* is fixed to the elastic plate 11*d*.

When a setting temperature is exceeded, the bimetal element 11*c* warps in an opposite direction and thus bends the elastic plate 11*d*, thereby bringing the movable contact 11*b* into contact with the fixed contact 11*a*. In this way, the bimetal element 11*c* serves as a thermally actuated element having a direction of warping that may be inverted with the setting temperature as a threshold.

The elastic plate 11*d* or a terminal material on the fixed-contact-11*a* side can be formed using a resistor material, e.g., stainless steel. Stainless steel, which may be a material used as a spring, has a high specific resistance. In a case where the resistor material is used for a conductive member, when energization starts upon the temperature switch being placed in a contact ON state due to an abnormal temperature, the resistor material generates a Joule heat corresponding to a flowing current. As a result, the bimetal element 11*c* is inverted, and the fixed contact 11*a* and the movable contact 11*b* come into contact which each other and are thus placed in the contact ON state. Thus, a current flowing through a load such as a LED starts to flow through the inside of the switch part 10, and the temperature starts to decrease, with the result that the switch part 10 is placed into the contact OFF state again at a certain temperature. However, since the Joule heat has been generated inside, the temperature of the bimetal element 11*c* can be kept equal to or higher than a temperature at which the contact ON state is maintained. This can be adjusted by means of a current value, the state of internal resistance, and a return temperature.

The electric element 20 may be checked by using a multimeter for resistance measurement or by checking heat generation resulting from energization by means of a thermal imaging camera.

The first terminal 12 is connected to the fixed contact 11*a* and exposed out of the switch part 10. The second terminal 13 is connected to the movable contact 11*b* and exposed out of the switch part 10.

Crimping parts 12*a* and 13*a* for connecting element lead wires 22 and 23 and external-circuit lead wires 31 and 32 (described hereinafter) by crimping the same are provided on leading end portions of the first terminal 12 and the second terminal 13. The element lead wires 22 and 23 and the external-circuit lead wires 31 and 32 may be concurrently connected to the crimping parts 12*a* and 13*a*.

After crimping, the crimping parts 12*a* and 13*a* may be subjected to an insulating process by mounting insulation tubes extending to the inside of the insulation case 14 on the crimping parts 12*a* and 13*a*. The element lead wires 22 and 23 and the external-circuit lead wires 31 and 33 do not necessarily need to be connected to the first terminal 12 and the second terminal 13 by crimping, and another fixing technique such as welding may be used. Alternatively, either the element lead wires 22 and 23 or the external-circuit lead wires 31 and 32 may be fixed by welding, and then the others may be connected by crimping.

Before being connected (fixed) to the element lead wires 22 and 23 and the external-circuit lead wires 31 and 32, the crimping parts 12*a* and 13*a* have U-shapes, as depicted in FIG. 2. After being crimped using a jig, the crimping parts 12*a* and 13*a* have cylindrical shapes covering the element lead wires 22 and 23 and the external-circuit lead wires 31 and 32, as depicted in FIG. 1.

The insulation case 14 accommodates the switch body 11. The insulation case 14 is shaped like a cuboid having five surfaces and one surface that includes an opening and is provided on the side on which the external-circuit lead wires 31 and 32 are provided.

As depicted in FIGS. 2 and 3, the electric element 20 includes an element body 21 and the element lead wires 22 and 23, which extend from two end portions of the element body 21. For example, the element body 21 may be a resistive body. During a time of contact opening, power consumption of the resistive body may be 1 W or less. To reduce heat generation of the electric element 20 during a time of contact opening between the fixed contact 11*a* and the movable contact 11*b*, in the case of, specifically, a 200 V power supply, a condition with a maximally small amount of heat generation at least for a range of 50-100 kΩ will be preferable.

For example, the resistive body may be a positive temperature coefficient (PTC) thermistor or may be a PTC thermistor having a surface coated for moisture prevention. In the case of the PTC thermistor, to which care needs to be given regarding overvoltage, important factors are condition selection without a voltage equal to or greater than twice the rated voltage, a temperature condition under which the resistance changes, and the resistance value at an ordinary temperature. In the abovementioned 200 V example, the resistance at an ordinary temperature needs to be increased as much as possible, and thus a setting for reducing heat generation that would occur during application of a voltage of 200 V with several tens of kilo-ohms will be preferable. The PTC thermistor is desirably coated for moisture prevention in consideration of application of a direct current.

The element body 21 may be a diode element such as a constant voltage diode or a light emitting diode. In the case of an element body 21 that is a constant voltage diode, the element body 21 may be disposed in a DC electric circuit as an electric element that does not generate heat at the voltage of a power supply and has a Zener voltage that is higher than the voltage of the power supply.

In the case of an electric element 20 that is a rectifying diode, the electric element 20 can function as a protection element because the electric element 20 serves within an electronic circuit as a protection against an abnormal voltage when being connected with a polarity with which a current does not flow during energization, and it is considered that an LED is especially vulnerable to a voltage opposite in polarity. Connection check can be addressed by performing a conduction inspection with a changed polarity or by checking a forward voltage by causing a current to flow in a forward direction.

As described above, one element lead wire 22 is connected to the first terminal 12 at the crimping part 12*a*, and the other element lead wire 23 is connected to the second terminal 13 at the crimping part 13*a*. Accordingly, the electric element 20 is located between the first terminal 12 and the second terminal 13 and connected in parallel to the fixed contact 11*a* and the movable contact 11*b*.

The entirety of the element body 21 and portions of the element lead wires 22 and 23 may be accommodated within the insulation case 14 with a partition between the switch body 11 and the element body 21 and element lead wires 22 and 23. An area around the element body 21 (electric element 20) is filled with a curable filler (e.g., resin).

The first external-circuit lead wire 31 to be connected to an external circuit is connected, as described above, to the first terminal 12 at the crimping part 12*a*. The second external-circuit lead wire 32 to be connected to the external circuit is connected, as described above, to the second terminal 13 at the crimping part 13*a*.

The external-circuit lead wires 31 and 32 include core wires 31*a* and 32*a* and insulating sheaths 31*b* and 32*b* covering the core wires 31*a* and 32*a*.

Figure 4:
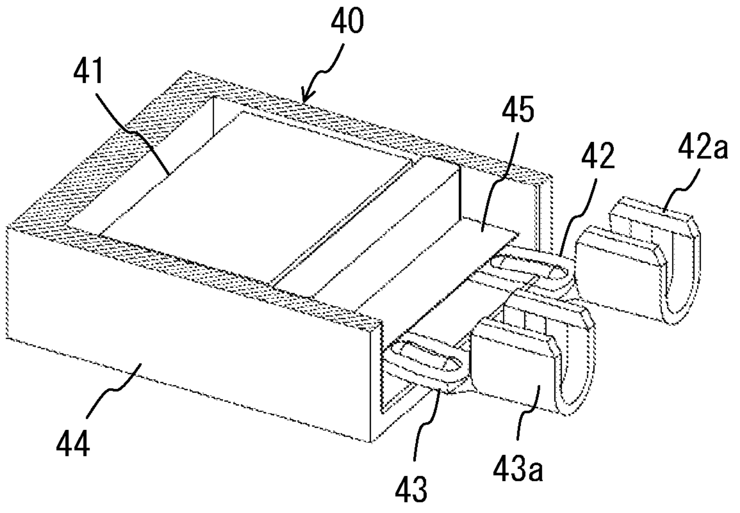
FIG. 4 is a cross-sectional view for illustrating a method of connecting an electric element in accordance with a variation of a first embodiment (example 1)
Figure 5:
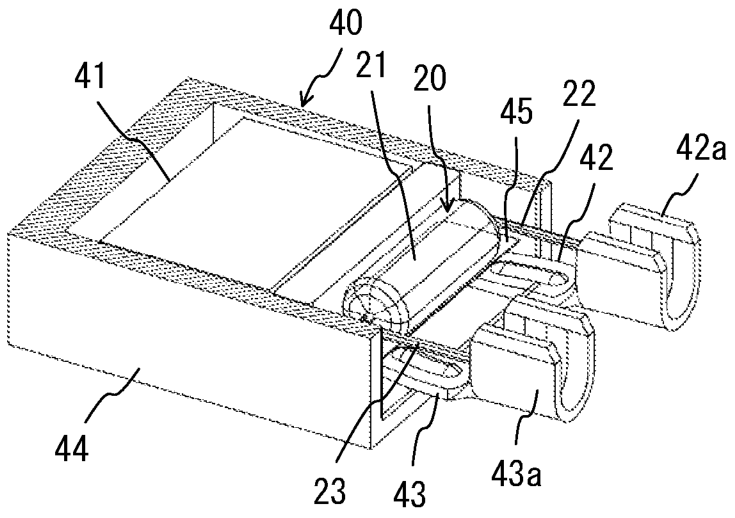
FIG. 5 is a cross-sectional view for illustrating a method of connecting an electric element in accordance with a variation of a first embodiment (example 2)

FIGS. 4 and 5 are cross-sectional views for illustrating a method of connecting the electric element 20 in accordance with a variation of the first embodiment.

A switch body 41, a first terminal 42 (crimping part 42*a*), a second terminal 43 (crimping part 43*a*), and an insulation case 44 of a switch part 40 are similar to the switch body 11, the first terminal 12 (crimping part 12*a*), the second terminal 13 (crimping part 13*a*), and the insulation case 14 of the switch part 10 depicted in FIGS. 1-3.

An insulating plate 45 is disposed between the electric element 20 and the first terminal 42 and second terminal 43. That is, the electric element 20 is positioned on the opposite side of the insulating plate 45 from the first terminal 42 and the second terminal 43.

As in the examples depicted in FIGS. 1-3, the element lead wires 22 and 23 and the external-circuit lead wires 31 and 32 are connected to the crimping part 42*a* of the first terminal 42 and the crimping part 43*a* of the second terminal 43.

In the meantime, the electric element 20 is, as in the first embodiment, connected in parallel to the fixed contact 11*a* and the movable contact 11*b*, such that during, for example, a contact OFF state at an ordinary temperature in which the fixed contact 11*a* and the movable contact 11*b* are spaced apart from each other, the electric element 20 is energized until a contact ON state in which the fixed contact 11*a* and the movable contact 11*b* are in contact with each other is attained. Thus, in a case where the electric element 20 is a resistive body, the resistive body will generate heat because of the resistance thereof and a flowing current. In a case where the switch body 11 is a temperature switch, the operation point could be affected if the temperature of heat generation of the resistive body is added to an ambient temperature; in the first embodiment, however, the influence on the sensing temperature of the bimetal element 11*c* will be reduced since the electric element 20 is connected outside the switch body 11.

A temperature switch may be required to be provided within a circuit for a lighting device using a LED so as to prevent overheating that could be caused by a LED element generating heat when the ambient temperature is high. When a temperature switch of an ordinary-temperature-period OFF type is used to prevent overheating of a LED, a module of such a LED element may be short-circuited by means of the temperature switch, thereby causing a current for turning on the LED to bypass and flow on the temperature-switch side so that heat generation of the LED can be stopped. However, a switch of an ordinary-temperature-period OFF type involves a large problem that without operating a temperature switch, it cannot be checked whether a proper connection to a circuit has been established.

According to the first embodiment, the electric element 20 may be incorporated concurrently with the connecting of the external-circuit lead wires 31 and 32 to the completed switch part 10 in a customer's factory, so that a connection check can be made during the connecting task. In addition, completion of the connecting at the end of the process can be checked if, for example, the resistance value of the electric element 20 can be checked. For example, the switch part 10 to which the electric element 20 is connected as described above may have two edge portions that, when overheating of the LED unit is sensed, are short-circuited making it so that a current equal to or greater than a predetermined value does not flow, because the power supply circuit is subjected to constant current control. Furthermore, use of a material with a high resistivity for the internal conductive member of the switch part 10 will allow a LED drive current to flow through the switch part 10, so that the inside of the switch part 10 during energization can generate heat, and when the power supply is in a connected state, a temperature equal to or higher than the return temperature of the temperature switch (a temperature at which the temperature switch returns into the contact OFF state) can be maintained, thereby preventing return from an energized state. Thus, the contact ON state resulting from abnormal heat generation can be maintained. Meanwhile, the switch part 10 can be returned to the contact OFF state, i.e., the initial state, by disconnecting the power supply.

In addition, regarding a current path implemented when the switch part 10 is in the contact ON state, a resistive body may be connected to the outside of the switch part 10 so as to provide a voltage lower than the total forward voltage of the LED module, so that a voltage can be generated in the resistive body by means of a current that flows after the switch part 10 is placed into the contact ON state. Hence, a low-intensity light state in which weak light is emitted without turning off the LED can be maintained, so that danger that could be incurred if the light is completely turned off can be avoided. In this case, since a current flows through the resistive body, a rectifying diode is connected as the electric element 20 in a direction opposite to the direction that is seen in the case of LED lighting.

Aside from the matters described above, in addition to performing the switching operation when an abnormality occurs, the switch part 10 may be arranged to monitor the temperature within the control apparatus all the time. In the case of the ordinary-temperature-period OFF type, however, the spaces between the contacts are always open and thus cannot be distinguished from spaces resulting from breaking of wire. In the first embodiment, the electric element 20 is connected in parallel to the fixed contact 11*a* and the movable contact 11*b*, and thus when, for example, the electric element 20 is a resistive element, it can be always checked that a monitoring function serving as a temperature sensor is effective, aside from an operation in an abnormal case such as giving an alarm with the contact ON state being set, by checking the resistance between the contacts, by checking a potential resulting from a voltage drop, or by sensing a current using some method.

Self-diagnosis of an advanced control apparatus may be required to be periodically performed, and connecting the electric element 20 can ensure the monitoring function all the time even in the case of the ordinary-temperature-period OFF type.

Meanwhile, when the switch part 10 is of an ordinary-temperature-period ON type, no changes will be exhibited at an ordinary temperature because a contact formed from the fixed contact 11*a* and the movable contact 11*b* short-circuits the electric element 20; however, even when the switch part 10 is operated and the fixed contact 11*a* and the movable contact 11*b* are separated from each other, the electric circuit is not placed in a complete open state, so that generation of surge can be suppressed. In particular, connecting an electric element 20 such as an arrestor having an operating voltage higher than circuit voltage allows a surge specific to an inductive load to be suppressed.

Especially when the switch part 10 and the like are not used within a metal housing of an electric product but are attached to a product developed into a planer-sheet shape and static electricity tends to affect an electric circuit connected to a contact, the operation temperature of the switch part 10 is low, and thus the contact open state could continue for a long time depending on the environmental condition. In addition, when the switch part 10 is operated and the power supply is disconnected with the contacts in the open state, a high voltage generated by electrostatic conduction could remain between the contacts. Even in a case where a high voltage remains like this between the contacts, the voltage induced between the contacts by static electricity can be released by connecting the electric element 20 in parallel between the contacts even if the contacts are in the open state.

The connection method for the electric element 20 in the first embodiment is a method of connecting the electric element 20 to the switch part 10 provided with: the fixed contact 11*a*, i.e., an example of the first contact; the first terminal 12 connected to the fixed contact 11*a* and exposed out of the switch part 10; the movable contact 11*b*, i.e., an example of the second contact, capable of moving to a position at which the movable contact 11*b* is in contact with the fixed contact 11*a* and a position at which the movable contact 11*b* is spaced apart from the fixed contact 11*a*; and the second terminal 13 connected to the movable contact 11*b* and exposed out of the switch part 10, the method comprising connecting the electric element 20 in parallel to the fixed contact 11*a* and the movable contact 11*b* between the first terminal 12 and the second terminal 13.

As described above, the first terminal 12 and the second terminal 13 are exposed out of the switch part 10. Hence, the electric element 20 suitable for use conditions can be easily connected to the completed switch part 10.

In the first embodiment, the first external-circuit lead wire 31 to be connected to an external circuit is connected to the first terminal 12 together with one element lead wire 22 of the electric element 20, and the second external-circuit lead wire 32 to be connected to the external circuit is connected to the second terminal 13 together with the other element lead wire 23 of the electric element 20. In this way, both the element lead wires 22 and 23 and the external-circuit lead wires 31 and 32 can be connected to the first terminal 12 and the second terminal 13, so that the electric element 20 can be connected more easily.

In the first embodiment, the switch part 10 further includes the insulation case 14 that accommodates the fixed contact 11*a* and the movable contact 11*b*, and the electric element 20 connected between the first terminal 12 and the second terminal 13 is accommodated within the insulation case 14. Hence, the electric element 20 can be connected in parallel to the fixed contact 11*a* and the movable contact 11*b* by means of a simple configuration.

In the first embodiment, an area around the electric element 20 accommodated within the insulation case 14 is filled with a curable filler. Hence, the switch part 10 and the electric element 20 can be concurrently fixed by the filler.

In the first embodiment, in a case where the electric element 20 is a resistive body with a power consumption of 1 W or less, heat generation of the electric element 20 that occurs during a time of contact opening between the fixed contact 11*a* and the movable contact 11*b* can be reduced.

In the first embodiment, the electric element 20 may be a diode element. For example, when the diode element is a rectifying diode, the diode element can function as a protection element because the diode element serves within the electronic circuit as a protection against an abnormal voltage when being connected with a polarity with which a current does not flow during energization, and it is considered that an LED is especially vulnerable to a voltage opposite in polarity.

In a variation of the first embodiment, the electric element 20 connected between the first terminal 42 and the second terminal 43 is positioned on the opposite side of the insulating plate 45 from the first terminal 42 and second terminal 43. Hence, the insulation distance that could be decreased due to the connection of the electric element 20 can be ensured by the insulating plate 45.

Second Embodiment

Figure 6:
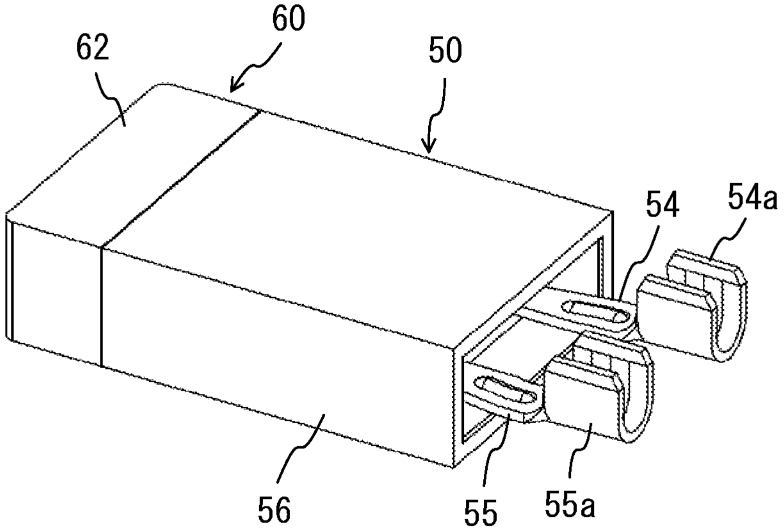
FIG. 6 is a perspective view for illustrating a method of connecting an electric element in accordance with a second embodiment.

FIG. 6 is a perspective view for illustrating a method of connecting an electric element 61.

Figure 7:
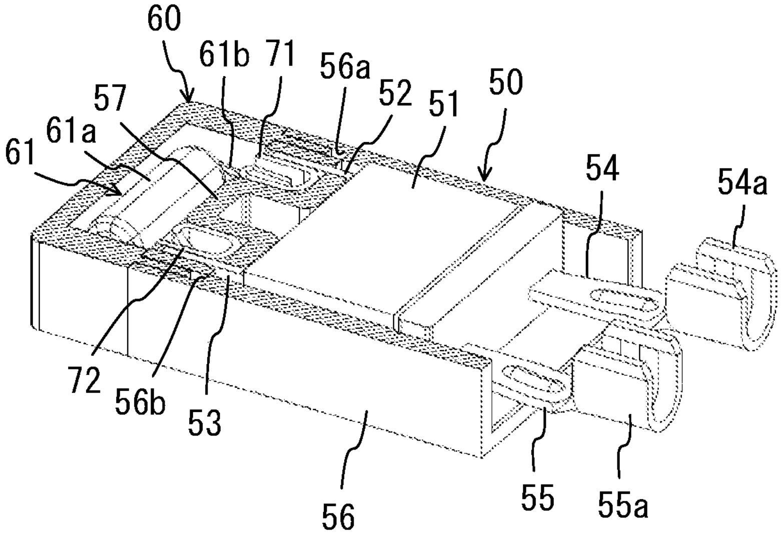
FIG. 7 is a cross-sectional view for illustrating a method of connecting an electric element in accordance with a second embodiment (example 1)
Figure 8:
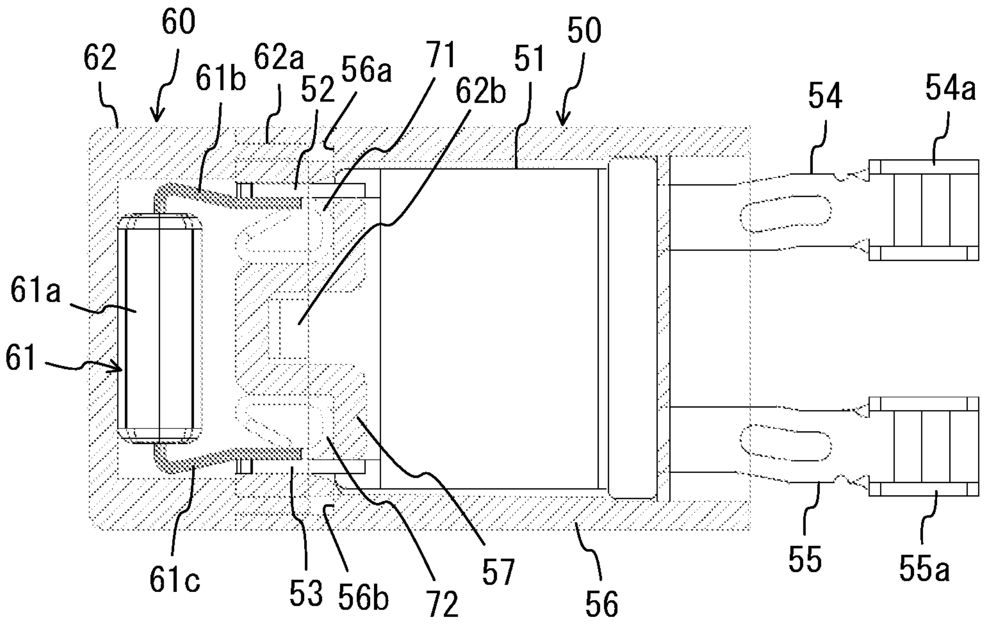
FIG. 8 is a cross-sectional view for illustrating a method of connecting an electric element in accordance with a second embodiment (example 2)

FIGS. 7 and 8 are cross-sectional views for illustrating a method of connecting the electric element 61.

Figure 9:
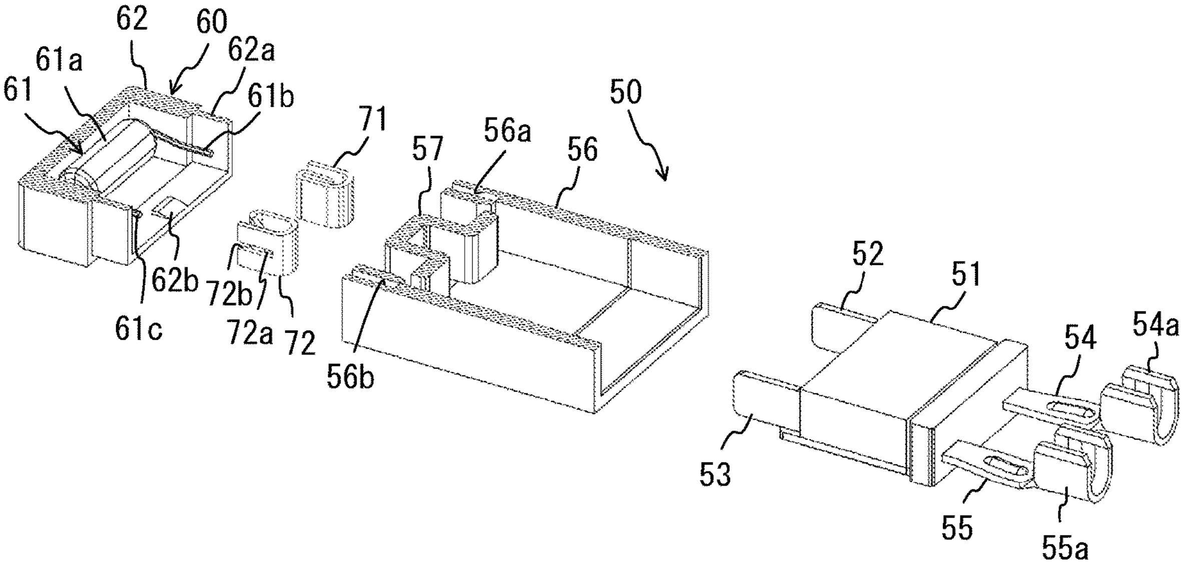
FIG. 9 is an exploded perspective view for illustrating a method of connecting an electric element in accordance with a second embodiment.

FIG. 9 is an exploded perspective view for illustrating a method of connecting the electric element 61.

Figure 10:
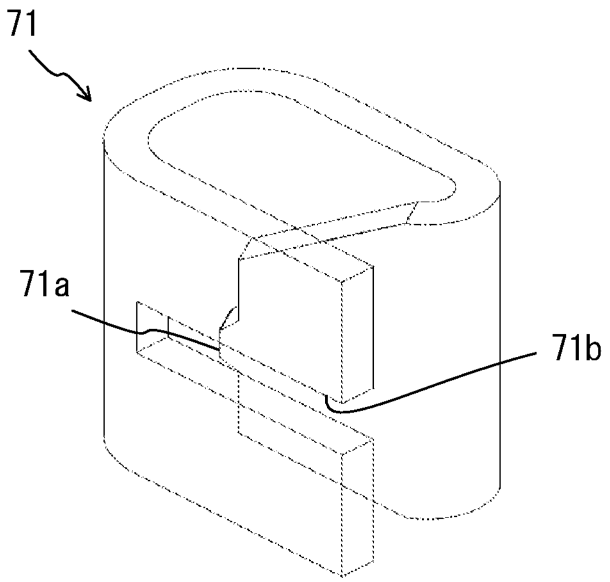
FIG. 10 is a perspective view illustrating a first flat spring in a second embodiment.

FIG. 10 is a perspective view illustrating a first flat spring 71.

A switch part 50 depicted in FIGS. 6-9 includes a switch body 51, a first terminal 52, a second terminal 53, a third terminal 54, a fourth terminal 55, an insulation case 56, and a flat-spring holding member 57. For example, the switch part 50 may form a temperature switch.

For example, as indicated above by referring to the first embodiment, the switch body 51 depicted in FIGS. 7-9 includes the fixed contact 11*a*, i.e., an example of the first contact, the movable contact 11*b*, i.e., an example of the second contact, the bimetal element 11*c*, and the elastic plate 11*d*, all of which are depicted in FIG. 3.

In the second embodiment, the external-circuit lead wires 31 and 32 depicted in FIGS. 1-3 are connected to crimping parts 54*a* and 55*a* of the third terminal 54, which is connected to the fixed contact 11*a*, and the fourth terminal 55, which is connected to the movable contact 11*b*.

The first terminal 52 is connected to the fixed contact 11*a* and exposed out of the switch part 50. The second terminal 53 is connected to the movable contact 11*b* and exposed out of the switch part 50. The first terminal 52 and the second terminal 53 extend from the switch body 51 in an opposite direction from the third terminal 54 and the fourth terminal 55.

The insulation case 56 accommodates the switch body 51. The insulation case 56 is shaped like a cuboid having four surfaces, and the following two surfaces: one surface that includes an opening and is provided on the side on which the first terminal 52 and the second terminal 53 are provided; and one surface that includes an opening and is provided on the side on which the third terminal 54 and the fourth terminal 55 are provided. The insulation case 56 is provided with insertion recesses 56*a* and 56*b*. An insertion projection

62*a* of an insulation cover 62 (described hereinafter) is inserted into the insertion recesses 56*a* and 56*b*.

The flat-spring holding member 57, which is an example of an elastic-body holding member, holds a first flat spring 71 and a second flat spring 72 (described hereinafter).

An electric element unit 60 includes an electric element 61 and the insulation cover 62.

The electric element 61 includes an element body 61*a* and element lead wires 61*b* and 61*c* extending from two end portions of the element body 61*a*.

The insulation cover 62 is shaped like a cuboid having five surfaces and one surface that includes an opening and is provided on the side on which the switch part 50 is provided. The insertion projection 62*a*, which is thinner than the other portions of the insulation cover 62, is provided in the vicinity of the opening of the insulation cover 62 in such a manner as to extend toward the switch part 50. As described above, the insertion projection 62*a* is inserted into the insertion recesses 56*a* and 56*b*.

Stoppers 62*b* indicated in FIGS. 8 and 9 are provided on the inner bottom surface and the inner upper surface of the insertion projection 62*a* (only the stopper on the bottom-surface side is depicted). The two stoppers 62*b* are caught on the bottom-surface side and the upper-surface side of the flat-spring holding member 57 and thus lock the electric element unit 60 on the switch part 50, thereby preventing the electric element unit 60 from dropping from the switch part 50.

The first flat spring 71 is an example of a first elastic body that presses one element lead wire 61*b* of the electric element 61 against the first terminal 52.

The first flat spring 72 is an example of a second elastic body that presses the other element lead wire 61*c* of the electric element 61 against the second terminal 53.

As depicted in FIG. 10, the first flat spring 71 is a plate-like member that is bent to be shaped like a cylinder, and a pressing section 71*a* for pressing the element lead wire 61*b* against the first terminal 52 is provided on one end portion of the first flat spring 71. A notch 71*b* into which the element lead wire 61*b* is inserted is provided on another end portion of the first flat spring 71. When inserting the element lead wire 61*b* into the notch 71*b*, the pressing section 71*a* is pressed upward by the element lead wire 61*b* so as to be spaced apart from the first terminal 52.

The pressing section 71*a* is inserted into the notch 71*b* in such a manner as to press the element lead wire 61*b* against the first terminal 52. This pressing action may also serve as the retaining or fastening of the element lead wire 61*b*.

As depicted in FIG. 9, the second flat spring 72 is, as with the first flat spring 71, a plate-like member that is bent to be shaped like a cylinder, and a pressing section 72*a* for pressing the element lead wire 61*c* against the second terminal 53 is provided on one end portion of the second flat spring 72. A notch 72*b* into which the element lead wire 61*c* is inserted is provided on another end portion of the second flat spring 72. When inserting the element lead wire 61*c* into the notch 72*b*, the pressing section 72*a* is pressed upward by the element lead wire 61*c* so as to be spaced apart from the second terminal 53.

The pressing section 72*a* is inserted into the notch 72*b* in such a manner as to press the element lead wire 61*c* against the second terminal 53. This pressing action may also serve as the retaining or fastening of the element lead wire 61*c*.

For example, when connecting the electric element 61 between the first terminal 52 and the second terminal 53, the insulation cover 62 without the electric element 61 accommodated therewithin may be removed from the insulation case 56, the first flat spring 71 and the second flat spring 72 may be placed in the insulation case 56, the electric element 61 may be placed in the insulation cover 62 (electric element unit 60), and the electric element unit 60 may be mounted into the insulation case 56. Upon the mounting, the element lead wires 61*b* and 61*c* of the electric element 61 are inserted into the notches 71*b* and 72*b* of the flat springs 71 and 72. Then, the element lead wires 61*b* and 61*c* are pressed against the first terminal 52 and the second terminal 53 by the pressing sections 71*a* and 72*a* of the flat springs 71 and 72. As a result, the electric element 60 can be connected in parallel to the switch body 51 (fixed contact 11*a* and movable contact 11*b*) between the first terminal 52 and the second terminal 53.

The electric element 61 is connected between the first terminal 52 and the second terminal 53 after the switch part 50 is completely assembled. However, this connecting process may be performed before or after the first external-circuit lead wire 31 and the second external-circuit lead wire 32 are connected to the third terminal 54 and the fourth terminal 55.

Figure 11:
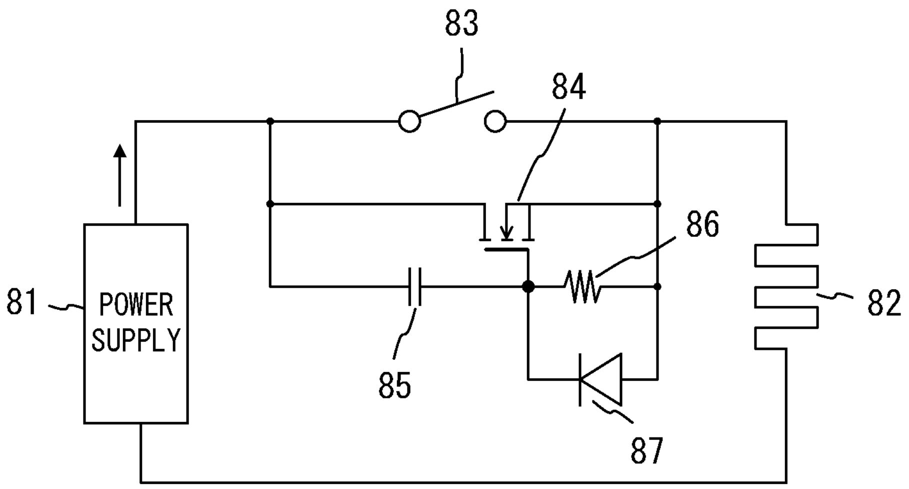
FIG. 11 is a circuit diagram for illustrating a variation of a second embodiment.

FIG. 11 is a circuit diagram for illustrating a variation of a second embodiment.

When a switch part 83 that includes first and second contacts is disposed as depicted in FIG. 11 in an external circuit that includes a power supply 81, a load 82, and the like, a metal-oxide-semiconductor field-effect transistor (MOSFET) 84, a capacitor 85, a resistor 86, and a diode 87 may be disposed in the above-described electric element unit 60 as examples of a plurality of electric elements connected in parallel to the first and second contacts.

The MOSFET 84, i.e., an example of a field effect transistor (FET), is connected in parallel to the capacitor 85 and the resistor 86. The diode 87 is connected in parallel to the resistor 86.

During a time of contact opening, the gate of the MOSFET 84 is driven using a voltage generated by an arc between the first and second contacts of the switch part 83. When the voltage disappears because of arc extinguishing, the MOSFET 84 is turned off, and disconnecting is completed. Thus, during a time of contact opening, the current is translocated to the electric element unit 60 (the side on which the plurality of electric elements are provided).

Connecting a semiconductor switch to be operated through a remote manipulation such as communication to the electric element unit allows an ordinary-temperature-period open state to be temporarily placed into an ON state through a remote manipulation during self-diagnosis so as to check the effectiveness of temperature monitoring.

The second embodiment can similarly attain effects corresponding to similar matters to the first embodiment. For example, the method of connecting the electric element 61 in accordance with the second embodiment includes connecting the electric element 61 in parallel to the fixed contact 11*a* and the movable contact 11*b* between the first terminal 52 and the second terminal 53 exposed out of the switch part 50. As described above, the first terminal 52 and the second terminal 53 are exposed out of the switch part 50. Hence, the electric element 61 suitable for use conditions can be easily connected to the completed switch part 50.

In the second embodiment, the switch part 50 includes the third terminal 54 connected to the fixed contact 11*a*, i.e., an example of the first contact, and the fourth terminal 55 connected to the movable contact 11*b*, i.e., an example of the second contact, connects, to the third terminal 54, the first external-circuit lead wire 31 to be connected to an external circuit, and connects, to the fourth terminal 55, the second external-circuit lead wire 32 to be connected to the external circuit. Thus, by using a space around the first terminal 52 and the second terminal 53 to which the electric element 61 is to be connected (e.g., a space on the opposite side from the third terminal 54 and the fourth terminal 55), the electric element 61 can be connected to the first terminal 52 and the second terminal 53.

In the second embodiment, one element lead wire 61*b* of the electric element 61 is pressed against the first terminal 52 by the first flat spring 71, i.e., an example of the first elastic body, and the other element lead wire 61*c* of the electric element 61 is pressed against the second terminal 53 by the second flat spring 72, i.e., an example of the second elastic body, so as to connect the electric element 61 between the first terminal 52 and the second terminal 53. Using the first flat spring 71 and the second flat spring 72 in this way allows the electric element 61 to be easily connected between the first terminal 52 and the second terminal 53 without performing a connecting task such as crimping or welding.

In the second embodiment, the switch part 50 further includes the insulation case 56 that accommodates the first contact (fixed contact 11*a*) and the second contact (movable contact 11*b*), and the electric element unit 60 accommodating the electric element 61 is mounted into the insulation case 56, thereby connecting the electric element 61 between the first terminal 52 and the second terminal 53. Thus, the electric element 61 can be connected between the first terminal 52 and the second terminal 53 through the simple task of mounting the electric element unit 60 into the insulation case 56.

In the variation of the second embodiment, the electric element unit includes the MOSFET 84, the capacitor 85, the resistor 86, and the diode 87, i.e., examples of a plurality of electric elements to which a current during a time of contact opening of the switch part 83 is translocated. As a result, for example, the gate of the MOSFET 84 that serves as an electric element may be driven by a voltage generated by an arc between the contacts, and when the voltage disappears because of arc extinguishing, the MOSFET 84 may be turned off, and disconnecting can be completed.

The first and second embodiments of the present invention have been described, but the present invention falls within the scope of the invention set forth in the claims and within the equivalent thereof. The following indicates, as appendixes, the invention recited in the claims of the present application as originally filed.

Appendix 1. A method of connecting an electric element to a switch part provided with a first contact, a first terminal connected to the first contact and exposed out of the switch part, a second contact capable of moving to a position at which the second contact is in contact with the first contact and a position at which the second contact is spaced apart from the first contact, and a second terminal connected to the second contact and exposed out of the switch part, the method comprising:

connecting the electric element in parallel to the first and second contacts between the first and second terminals. Appendix 2. The method of connecting an electric element of appendix 1, further comprising:

connecting, to the first terminal, one element lead wire of the electric element and a first external-circuit lead wire to be connected to an external circuit, and connecting, to the second terminal, another element lead wire of the electric element and a second external-circuit lead wire to be connected to the external circuit.

Appendix 3. The method of connecting an electric element of appendix 1 or 2, wherein the switch part further includes an insulation case that accommodates the first and second contacts, the method further comprising:

causing the electric element connected between the first and second terminals to be accommodated within the insulation case.

Appendix 4. The method of connecting an electric element of appendix 3, further comprising:

filling an area around the electric element accommodated within the insulation case with a curable filler.

Appendix 5. The method of connecting an electric element of any of appendixes 1-4, further comprising:

positioning the electric element connected between the first and second terminals on an opposite side of an insulating plate from the first and second terminals.

Appendix 6. The method of connecting an electric element of appendix 1, wherein the switch part further includes a third terminal connected to the first contact and a fourth terminal connected to the second contact, the method further comprising:

connecting, to the third terminal, a first external-circuit lead wire to be connected to an external circuit and connecting, to the fourth terminal, a second external-circuit lead wire to be connected to the external circuit.

Appendix 7. The method of connecting an electric element of appendix 6, further comprising:

connecting the electric element between the first and second terminals by pressing one element lead wire of the electric element against the first terminal by means of a first elastic body and pressing another element lead wire of the electric element against the second terminal by means of a second elastic body.

Appendix 8. The method of connecting an electric element of appendix 6 or 7, wherein the switch part further includes an insulation case that accommodates the first and second contacts, the method further comprising:

connecting the electric element between the first and second terminals by mounting an electric element unit accommodating the electric element into the insulation case. Appendix 9. The method of connecting an electric element of appendix 8, wherein the electric element unit includes a plurality of said electric elements, to which a current during a time of contact opening of the switch part is translocated.

Appendix 10. The method of connecting an electric element of any of appendixes 1-9, wherein the electric element is a resistive body, and power consumption of the resistive body is 1 W or less.

Appendix 11. The method of connecting an electric element of any of appendixes 1-9, wherein the electric element is a diode element.

EXPLANATION OF THE CODES

10: Switch part
11: Switch body
11*a*: Fixed contact
lib: Movable contact
11*c*: Bimetal element
11*d*: Elastic plate
12: First terminal
12*a*: Crimping part
13: Second terminal
13*a*: Crimping part

14: Insulation case
20: Electric element
21: Element body
22, 23: Element lead wire
31: First external-circuit lead wire
31*a*: Core wire
31*b*: Sheath
32: Second external-circuit lead wire
32*a*: Core wire
32*b*: Sheath
40: Switch part
41: Switch body
42: First terminal
42*a*: Crimping part
43: Second terminal
43*a*: Crimping part
44: Insulation case
45: Insulation plate
50: Switch part
51: Switch body
52: First terminal
53: Second terminal
54: Third terminal
54*a*: Crimping part
55: Fourth terminal
55*a*: Crimping part
56: Insulation case
56*a*, 56*b*: Insertion recess
57: Flat-spring holding member
60: Electric element unit
61: Electric element
61*a*: Element body
61*b*, 61*c*: Element lead wire
62: Insulation plate
62*a*: Insertion projection
62*b*: Stopper
71: First flat spring
71*a*: Pressing section
71*b*: Notch
72: Second flat spring
72*a*: Pressing section
72*b*: Notch
81: Power supply
82: Load
83: Switch part
84: MOSFET
85: Capacitor
86: Resistor
87: Diode

The invention claimed is:

1. A method of connecting an electric element in a switch, the switch including a first contact, a first terminal connected to the first contact and exposed out of the switch, a second contact capable of moving to a position at which the second contact is in contact with the first contact and a position at which the second contact is spaced apart from the first contact, a second terminal connected to the second contact and exposed out of the switch, a third terminal connected to the first contact, a fourth terminal connected to the second contact, and an insulation case that accommodates the first and second contacts, a first elastic body and a second elastic body, the electric element being placed in an insulation cover, each of the first and second elastic bodies having a notch, the method comprising:

connecting the electric element in parallel to the first and second contacts between the first and second terminals;

connecting, to the third terminal, a first external-circuit lead wire to be connected to an external circuit; and connecting, to the fourth terminal, a second external-circuit lead wire to be connected to the external circuit, wherein the connecting of the electric element includes, by mounting the insulation cover on the insulation case, inserting a first element lead wire of the electric element into the notch of the first elastic body, pressing the first element lead wire against the first terminal by the first elastic body, inserting a second element lead wire of the electric element into the notch of the second elastic body, and pressing the second element lead wire of the electric element against the second terminal by the second elastic body, whereby the electric element is connected between the first and second terminals.

2. The method of claim 1, wherein the electric element includes a transistor connected in parallel to the first and second contacts of the switch between the first and second terminals, and the transistor is driven by a voltage generated by an arc between the first contact and the second contact of the switch so as to pass a current through the electric element during a time of contact opening of the switch.

* * * * *